Dec. 16, 1952  R. O. BEARDSLEY ET AL  2,621,556
COMPARATOR FOR TESTING TURBINE BLADES AND THE LIKE
Filed April 28, 1949  4 Sheets-Sheet 1
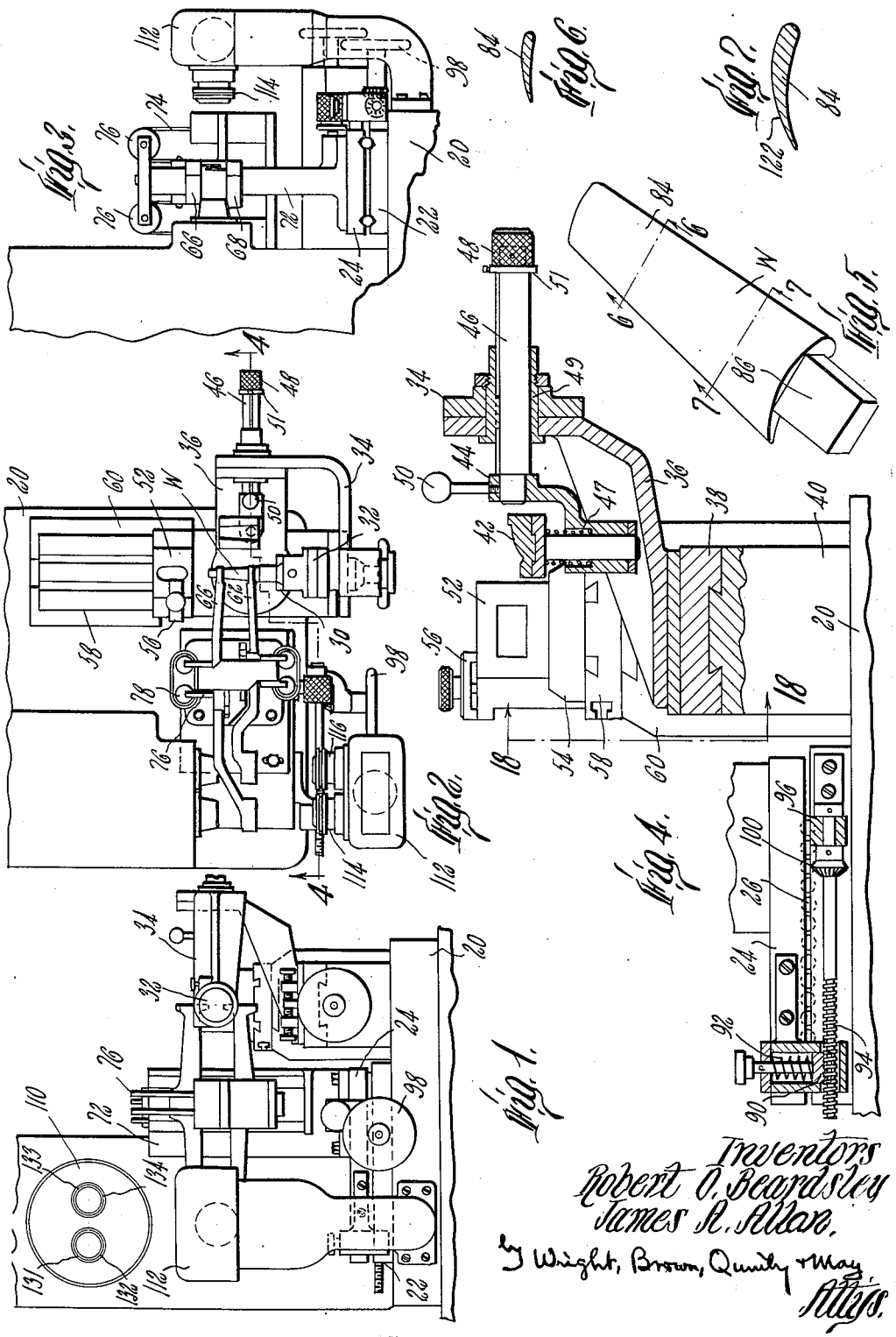
Inventors
Robert O. Beardsley
James R. Allan Dec. 16, 1952     R. O. BEARDSLEY ET AL     2,621,556
COMPARATOR FOR TESTING TURBINE BLADES AND THE LIKE
Filed April 28, 1949     4 Sheets-Sheet 2
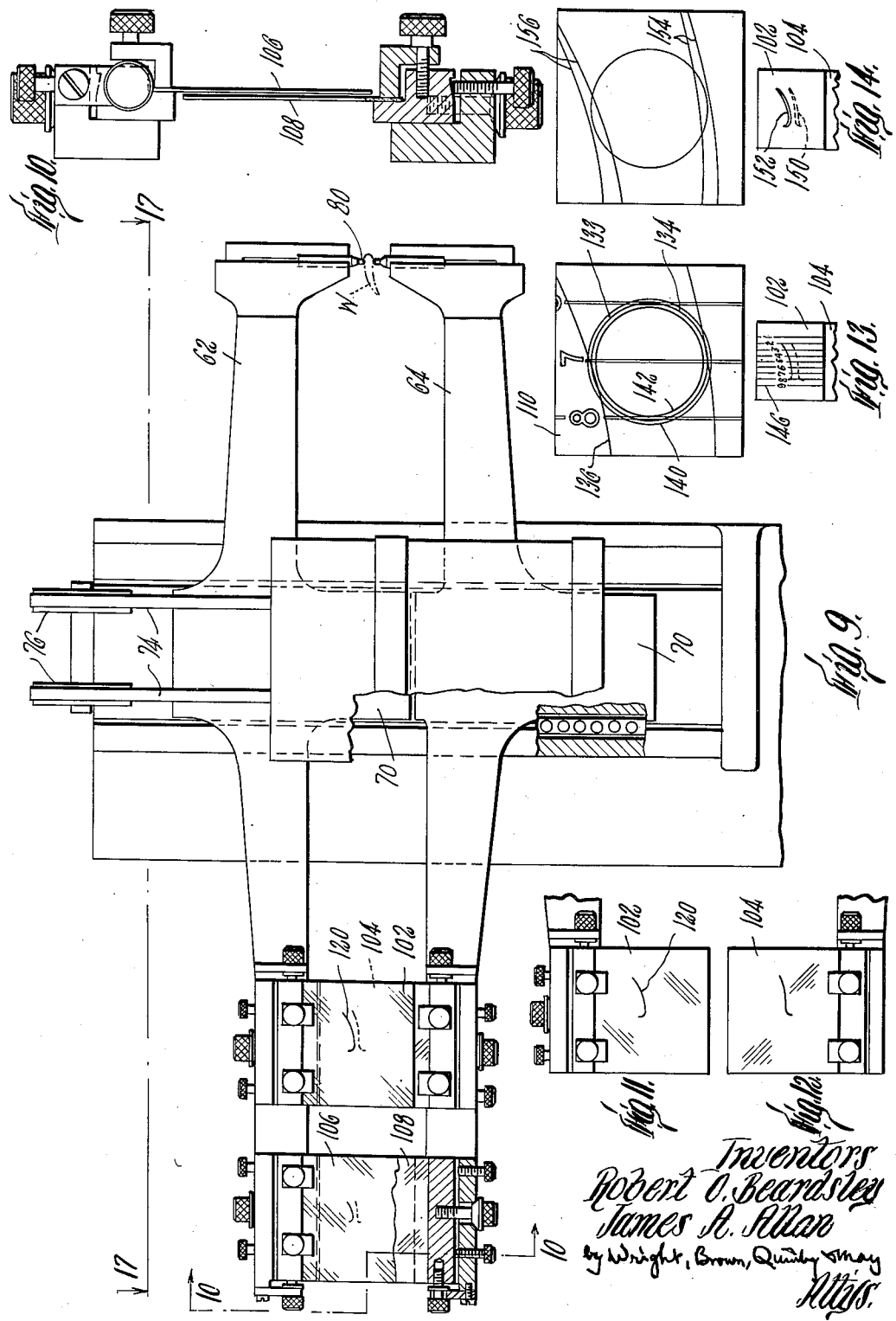

Dec. 16, 1952     R. O. BEARDSLEY ET AL     2,621,556
COMPARATOR FOR TESTING TURBINE BLADES AND THE LIKE
Filed April 28, 1949     4 Sheets-Sheet 3
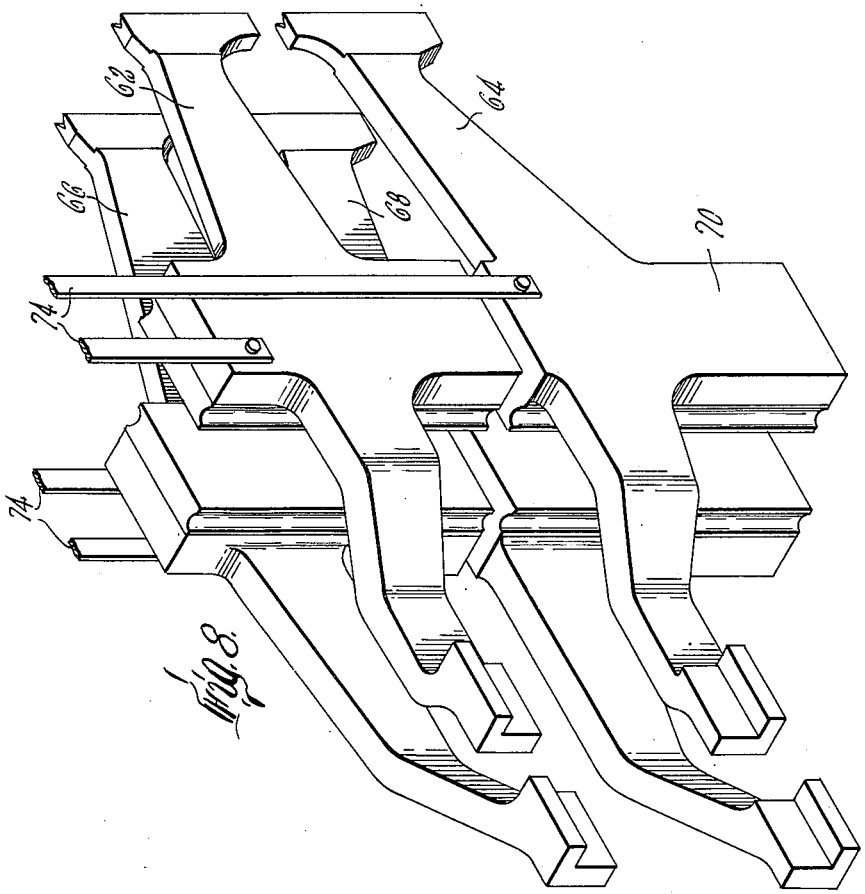
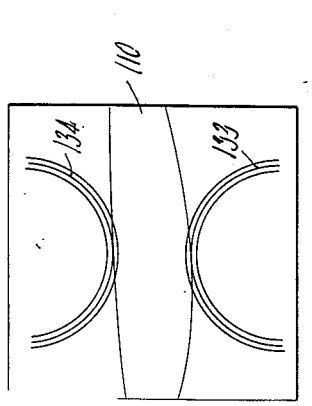
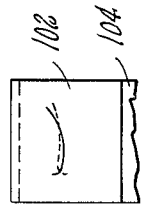
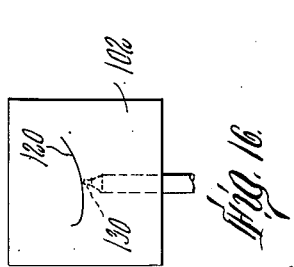
Inventors
Robert O. Beardsley
James A. Allan
by Wright, Brown, Quinby & May
Attys.

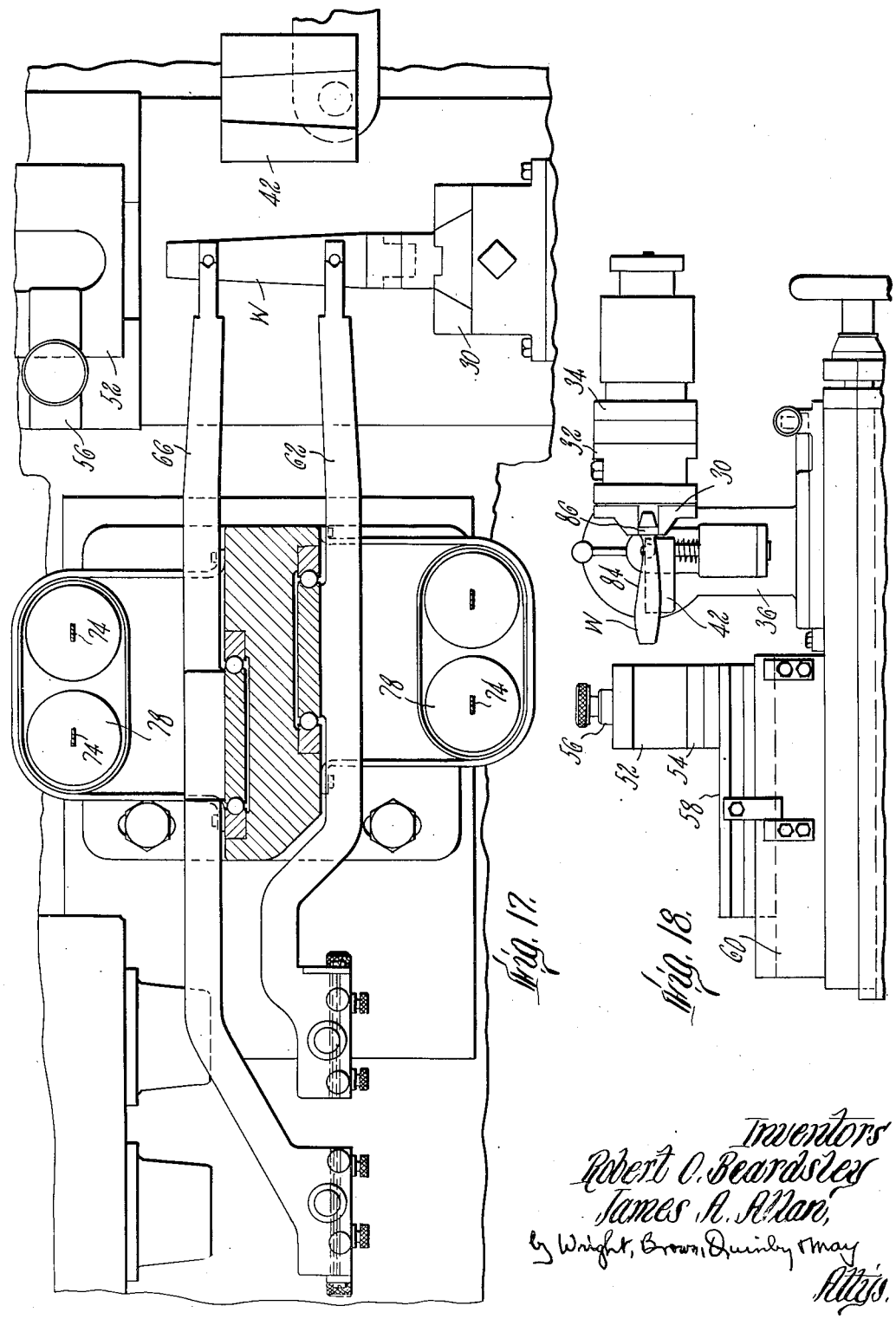

Patented Dec. 16, 1952

2,621,556

UNITED STATES PATENT OFFICE 2,621,556

COMPARATOR FOR TESTING TURBINE BLADES AND THE LIKE

Robert O. Beardsley and James A. Allan, Springfield, Vt., assignors to Jones & Lamson Machine Company, Springfield, Vt., a corporation of Vermont Application April 28, 1949, Serial No. 90,246

9 Claims. (Cl. 88—14)

This invention relates to apparatus for examining or testing cross-sectional contours of objects such as turbine blades, wherein a high degree of uniformity of shape is essential. Turbine rotors usually have large numbers of blades and are designed for rotation at high speeds. This necessitates a uniformity of contour of the blades which can, as a practical matter, be obtained only by testing each blade individually. Such testing has heretofore been difficult and tedious, adding greatly to the cost of the turbine. Apparatus employing a comparator for accurate testing of contours is described in a copending application, Serial No. 760,228, filed July 11, 1947, now Patent No. 2,580,239, issued December 25, 1951. The apparatus shown and described in that application includes a chuck for holding in a fixed position a turbine blade to be tested, a pair of vertically movable arms carrying feeler tips which are movable across the upper and lower surfaces of the blade, and tracer tips on said arms which reproduce the movements of the feeler tips and cast shadows on the screen for comparison with master outlines thereon. The feeler tips are made to travel transversely across the blade in a plane perpendicular to the long axis of the blade and the blade may be axially shifted for examination successively in two or more such planes, according to the master contours provided on the screen.

In addition to having a correct surface contour for each blade, it is equally necessary that the blades in a stage of a turbine rotor be properly located and oriented with respect to the core of the rotor and to each other. This means that the roots of the blades, which interlock with the periphery of the core, must be correctly related to the air-foil contour of the blade. A co-pending application, Serial No. 795,109, filed December 31, 1947, for Holding Fixtures, now Patent No. 2,540,774, issued February 6, 1951, shows and describes a chuck to be used in connection with a comparator, the chuck being rotatively adjustable on three axes to facilitate the proper orientation of the air-foil surfaces of a turbine blade held thereby. When the blade has been adjusted to the correct position, a mold is placed about it in a predetermined position with relation to the blade, and a casting of fusible material such as a low-melting-point metal is made in the mold to fix the blade in a definite position with respect to faces of the metal block cast in the mold, such faces serving as planes of reference by which the blade can easily and accurately be mounted in a machine for tooling the root and shroud piece of the blade.

According to the present invention, a movable cradle is provided to support a blade temporarily in the correct position for inspection while the chuck is being operated to grip the root of the blade. The temporary support is then withdrawn to make way for the contact elements by which the examination of the blade surface contour is achieved. For this purpose, a comparator is provided with means by which two spaced contours of a turbine blade in parallel planes can be examined simultaneously. Thus, the entire examination of a blade for trueness of surface contour is made in the time it takes for the feeler tips to make one pass across the blade. This saves the time otherwise required for an additional pass or passes across the blade and for shifting the position of the blade between passes. The simultaneous examination of two contours also greatly shortens the time required for properly orienting a blade for the casting of a reference block around it. It has been found that for practical purposes the examination of two contours of a blade in spaced, transverse planes is a sufficient test of the accuracy of the air-foil surfaces of the blade.

The present invention also includes improved means for indicating limits of tolerance within which the observed contours must keep if the blade is to be deemed to be acceptable.

As hereinafter more fully described, the improved apparatus is equipped with two pairs of feeler tips preferably of hemispherical shape, adapted to be moved transversely across the upper and lower faces of a turbine blade which is held in a fixed horizontal position, the pairs of tips being movable in parallel planes which are spaced from each other and also inward from the ends of the air-foil portion of the blade. Mounted on the arms which carry the feeler tips are reticles which copy the movements of the respective tips. Each reticle is an opaque line having the size and shape of the portion of the contour of a master blade traversed by the corresponding feeler tip. This line may conveniently be provided in the form of an etching on a transparent or translucent plate mounted on the arm and moves transversely in a light beam which passes through a suitable optical train to focus on a screen a magnified image of the portion of the line in or near the center of the beam. On the screen are four semi-circles, conveniently juxtaposed, which may be in the form of two complete circles. Each semi-circle represents the magnified outline of the semi-circular profile of one of the feeler tips. Since the feeler tips are preferably hemispheres having a small radius, the semi-circles on the screen may and preferably do represent a considerable degree of magnification of the contours of the tips. It is, of course, necessary to magnify the work-piece contour to the same degree, but this can be done, as a practical matter, regardless of the size of the work-piece, because only a very small portion of the work-piece contour need be represented on the screen at any one time, as hereinafter explained. Thus, a comparatively high degree of magnification can be employed with the use of a relatively small screen. This particular feature is the invention of Purser and is described and claimed by him in a copending application filed concurrently herewith.

In order to indicate the limits of tolerance by which a blade contour may permissibly vary from the master contour, two concentric semi-circles may be made on the screen with each profile semi-circle, or if preferred, each reticle may consist of two lines defining the zone of tolerance, instead of a single line reproducing the contour portion of a master blade.

In order to facilitate locating any abnormality of contour beyond the limits of tolerance, identifying reference marks such as numbers may be added to successive portions of each reproduction in such a way that enlarged images of successive marks or numbers appear on the screen with the respective portions of the contour reproduction which they identify.

Various other advantageous features of the invention will be apparent to one skilled in the art from the following description thereof and from the drawing, of which—

Figure 1 is a front elevation of an embodiment of the invention;

Figure 2 is a plan view of the same;

Figure 3 is an end view of the same;

Figure 4 is a section on the line 4—4 of Figure 2, on a larger scale;

Figure 5 is a perspective view of a turbine blade;

Figures 6 and 7 are sections on the lines 6—6 and 7—7, respectively, of Figure 5;

Figure 8 is a perspective view of the movable arms of the apparatus;

Figure 9 is a front elevation of the supporting mechanism for feeler tips and contour reproductions;

Figure 10 is a section on the line 10—10 of Figure 9;

Figures 11 and 12 are front elevations of two transparent plates which carry reticles;

Figure 13 is an elevation of a pair of transparent plates having reticles thereon, and a corresponding portion of a screen having magnified feeler tip profiles and tolerance limits indicated thereon;

Figure 14 is an elevation of a pair of transparent plates having reticles thereon defining tolerance limits, and a corresponding portion of a screen having a single reference circle thereon representing magnified feeler tip profiles;

Figure 15 is an elevation of a pair of transparent plates having reticles arranged thereon to cooperate with a screen on which the fixed semi-circles are convex toward each other;

Figure 16 is an elevation of one of the plates shown in Figure 15, together with a fixed reproduction of the upper feeler tip shown in Figure 9;

Figure 17 is a section on the line 17—17 of Figure 9; and

Figure 18 is a front elevation of a portion of the apparatus as indicated by the line 18—18 in Figure 4.

Apparatus embodying the invention is illustrated in Figures 1 and 2, which show a base 20 on which is a bed 22. A carriage 24 is movably mounted on the bed 22, preferably on ball bearings 26, as indicated in Figure 4. The bearings are arranged so as to permit horizontal movement of the carriage 24 transversely with respect to the base 20. Also mounted on the base is a work-holder which comprises a chuck 30 carried by a member 32 which is rotatable about a horizontal, front-to-rear axis in a bracket 34. The bracket is rockable about a horizontal axis at right angles to that of the member 32 and is supported by a frame 36 which is rockable about a vertical axis and is mounted on a slide 38 (Figure 4) connected by a dovetail joint to a block 40 mounted on the base 20.

The vertical rocking axis of the frame 36 meets the horizontal axes at their point of intersection and the chuck 30 is arranged to support a work-piece, such as a turbine blade W, in the position illustrated in Figure 2, in which the mid-point of the turbine blade is at the point of intersection of the three axes when the root is gripped by the chuck 30. The orientation of the work-piece or turbine blade is thus readily adjusted in three dimensions. In order to facilitate the initial location of the work-piece, a cradle 42 is provided, this cradle being supported by a bracket 44 mounted on a horizontal rod 46, which is splined in a bearing member 49 carried by the frame 36 so as to be longitudinally slidable in the bearing without rotation. As shown in Figure 4, the cradle 42 is arranged to yield downward against the pressure of a spring 47. The rod 46 may be manipulated by a finger knob 48 by which it is pushed toward the left to receive and support temporarily a work-piece to be gripped by the chuck 30. When the work-piece has been secured in the chuck 30, the cradle 42 is retracted to the right so as to be clear of the blade, the cradle yielding downwardly against the spring 47 to the extent necessary for such retracting movement. The cradle-carrying bracket 44 can be adjusted on the rod 46 by backing off a set-screw 50 which normally fixes it on the end of the rod. Thus, after a batch of blades has been examined, the cradle can readily be adjusted, if necessary, to receive a batch of blades of another shape. The limit of travel of the rod 46 toward the left can be adjusted as required by shifting a collar 51 on the rod and securing it in adjusted position by any suitable means.

When a work-piece has been properly oriented with respect to fixed locating faces of the main frame and has been tested for accuracy of surface contour of the air-foil surfaces, as hereinafter described, a block of fusible material is cast around the air-foil part so as to provide plane faces of reference accurately related to the air-foil surfaces so that the cast block containing the blade can be easily and accurately fixed in a machine for tooling the root of the blade and also the shroud piece, if any.

As described in the said application, Serial No. 795,109, now Patent No. 2,540,774, a mold 52 is mounted on a block 54 which has a plane upper face, a portion of this upper face serving as the bottom of the mold. The mold 52 may be suitably secured on the block 54 by any convenient means, such as a clamp 56. The block 54 is secured to a table 58 which is slidable in a front-to-rear, horizontal direction on a support 60 (Figure 18), this support being secured on a part of the base 20. The table 58 with the block 54 and mold 52 secured thereon, is adapted to be moved from the position shown to a position in which most of the air-foil portion of the blade W is within the mold 52 after the blade has been properly oriented and examined, as hereinafter described. The ends of the mold are then closed by gates (not shown) and the mold is filled with fusible material, such as a low-melting-point alloy. When the fusible material is solidified, the mold with the casting containing the work-piece is removed from the block 54 and the casting is taken out of the mold, the apparatus then being ready to receive the next work-piece to be examined.

For testing or examining the cross-sectional contours of the work-piece, four arms 62, 64, 66 and 68 are provided, as best illustrated in Figure 8. Each of these arms is provided with a central block 70 which is slidable up and down vertically on a standard 72 projecting up from the carriage 24. Attached to each block 70 is a flexible element 74, such as a cord or metal band passing over a sheave 76 to a counterweight 78, there being four such counterweights for the four blocks 70. The respective counterweights are carefully adjusted so as to be slightly outweighed by the upper arms 62 and 66 but to outweight the lower arms 64. At the extremities of the four arms at the right-hand end thereof, as in Figures 8 and 9, feeler tips 80 are securely clamped, the feeler tips carried by the front pair of arms 62 and 64 being vertically alined and opposing each other, the feeler tips carried by rear pair of arms 66 and 68 also being vertically alined but offset rearwardly from the tips on the arms 62 and 64. The work-piece W is held in a position transverse to the horizontal paths of motion of the tips 80 so that the tips move across the upper and lower air-foil surfaces of the work-piece but in parallel planes which are substantially spaced apart when the carriage 24 is moved to the right or left. The counterweights 78, which are connected to the four arms, maintain the four feeler tips 80 gently pressing against respective surface portions of the work-piece.

The front-to-rear spacing between the two pairs of arms is such that the feeler tips carried by these arms can move simultaneously across the upper and lower surfaces of the work-piece in transverse planes which are near, but are spaced inwardly from, the respective ends of the air-foil portion of the work-piece. For example, a typical turbine blade W is illustrated in Figure 5, this blade having an airfoil portion 84 and a root 86 projecting from the larger end of the air-foil portion. Cross-sections of the air-foil portion 84 taken on transverse planes near the shroud and root ends respectively of the blade are shown in Figures 6 and 7.

For convenience of operation of the carriage 24, a half nut 90 (Fig. 4) is carried thereby and is spring-pressed, as by a spring 92, into meshing engagement with a screw 94. The screw rotates in a fixed bearing 96 and is turned by a conveniently located hand wheel 98 which is connected to the screw 94 by beveled gears 100. It is thus evident that rotation of the hand wheel 98 will result in horizontal movement of the carriage 24 toward the right or left and similar movement of the four feeler tips 80. As these tips traverse the air-foil surfaces of the work-piece, they will move independently up and down according to the contour of the surface portion of the work-piece against which they lightly press. Hence, as indicated in Figure 9, the feeler tips carried by the arms 62 and 64 will move in paths describing the upper and lower contour shapes of the work-piece in a transverse plane near the root end of the blade. At the same time, the feeler tips carried by the arms 66 and 68 will describe the contours of the upper and lower surfaces of the blade in a parallel plane near the shroud end thereof.

At the ends of the arms remote from the ends which carry the feeler tips are mounted reticles having the shapes of the contour portions of a master work-piece followed by the respective feeler tips. These reticles may be constructed in any convenient manner. For example each reticle may be in the form of an opaque line, preferably etched in the surface of a light-transmitting plate, in the shape of the portion of the contour traced by the corresponding feeler tip 80.

The forward arms 62 and 64 carry transparent plates 102 and 104 respectively, these plates being arranged close to each other in planes which are in or parallel to the plane of movement of the feeler tips 80 carried by these arms. The rear pair of arms 66 and 68 similarly carry parallel transparent plates 106 and 108 respectively, these plates being close to each other and preferably in the same planes with the plates 102 and 104 respectively.

An optical system is provided to cast magnified shadow images of portions of the reticles carried by the plates 102, 104, 106, 108, on a suitable screen 110. For this purpose, a lamp house 112 is mounted on the base 20, the house being provided with two condenser lenses in holders 114 and 116, to project parallel beams of light through the transparent plates carried by the arms. The light beams are focused by suitable lens systems so as to cast magnified images on the screen 110, these images being side by side for convenient simultaneous observation. The standard outlines on the transparent plates move therewith when the feeler tips move across the surfaces of a work-piece. In the apparatus illustrated on the drawings, the movement of each feeler tip 80 is duplicated by the plate which is carried by the same arm. Hence, the reticles on these plates consist of outlines of contour portions of the workpiece which are not only of the same shape as such contour portions but also of the same size. Since it is desirable to magnify the reticles to a considerable degree in casting shadow images on the screen, only a small portion of each reticle is projected on the screen at one time, thus permitting the use of a screen which is much smaller than would be required if an entire reticle were projected on the screen all at once.

Examination of the contours of the work-piece is made by comparing the position of each reticle shadow image on the screen with an equally magnified image of the profile of the corresponding feeler tip. The relation between the movements of the feeler tips on the work and the movements of the shadow images on the screen may be best understood from Figure 16, which shows the plate 102 having thereon an opaque outline 120 similar in size and shape to the upper surface contour 112, as indicated in Figure 7, of a master blade having accurate contours. This upper portion 122 is the portion of the contour engaged by the feeler tip carried by the arm 62 as it moves across the work-piece. Figure 16 also includes a representation of a fixed profile corresponding to the profile of the tip 80 on the upper arm 62. It should be noticed that the actual tip 80 moves along a fixed work-piece, but that at the other end of the arm the outline 120 is moving and the tip outline 130 is fixed. Hence the relative movements in the two cases are opposite. For example, if the tip 80 moves upward and toward the right on the work-piece, the apparent movement of the fixed reproduction 130 of the tip, relative to the outline 120, is downward and toward the left. Hence, the outline 120 is the same size and shape as the contour portion of the work-piece along which the tip moves, but is turned around through an angle of 180°, as may be seen by comparing the outline 120 shown in Figure 16 with the contour portion 122 shown in Figure 7. The profile of the feeler tip is also inverted.

In the actual apparatus, it is not necessary to employ a feeler tip profile 130 in the path of the light beam so as to have a shadow image cast on the screen 110. Instead of that, a fixed semi-circle is provided on the screen itself to represent the magnified image of the imaginary profile 130 shown in Figure 16, thus corresponding to the profile of the actual tip 80 on the arm 62. This semi-circle will be tangent to the shadow image of the portion of the reticle 120 which appears on the screen if the corresponding feeler tip 80 is in contact with a blade surface with a true contour.

Since there are four hemispherical feeler tips carried by the four arms, it is necessary to provide four corresponding semi-circles 131, 132, 133 and 134 on the screen to represent the magnified profiles of these feeler tips. The four semi-circles can be arranged in the form of two circles with the semi-circles 131 and 133 above the semi-circles 132 and 134, as indicated in Figure 1, or can be arranged with the semi-circles 132 and 134 above the semi-circles 131 and 133, as indicated in Figure 15, the relative elevations of the corresponding reticles being adjusted accordingly.

Figure 13 shows a portion of the chart 110 with the semi-circles 133 and 134 thereon forming a circle. This circle provides reference profiles for the reticles on the plates 102 and 104. For comparison between the figures of the drawings, these reticles are shown in Figures 9 and 13 in their relative positions corresponding to the relative positions of the feeler tips 80 shown in Figure 9. These tips are near the end of their travel across the work-piece W and are at their position of maximum separation from each other. The semi-circle 133 corresponds to the profile of the upper feeler tip, that is, the tip carried by the arm 62. The semi-circle 134 corresponds to the profile of the feeler tip carried by the upper arm 64. Hence, the shadow image 136, indicated on the screen 110 in Figure 13, is a small portion of the image of the reticle 120. As long as the shadow images on the screen are tangent to the semi-circles, the portions of the upper and lower contours being traversed by the feeler tips in the arms 62 and 64 are correct. In order to determine readily whether any deviations of a work-piece contour from the correct contour are within specified limits of tolerance, such limits may be indicated by fixed circles 140 and 142 which, as shown in Figure 13, are respectively outside and inside of the profile circle and are concentric therewith. If the shadow images of the reticles, as they move past the circles 134, cut the circle 140 but do not cut the inner circle 142, the contours are within their zones of tolerance. If, however, either of the shadow images fails to cut the outer circle 140 or the inner circle 142, the work-piece is defective. In order to determine readily at what point a defect occurs, the reticle shown in Figure 13 may include a series of equally spaced parallel lines 146, these lines intersecting the outline on one of the plates and being numbered for ready identification. Portions of the lines with identifying numbers appear on the screen, as shown in Figure 13. In addition to indicating whether the individual contours of the work-piece in the planes of movement of the feeler tips are correct, the simultaneous operation of the two pairs of tips also indicates whether or not the work-piece is properly oriented. For example, if during a pass of the feeler tips across the work-piece, the shadow images representing the movements of one pair of tips remain within the zone of tolerance on the screen while the shadow images representing the movements of the other pair of tips are consistently above or below their zones of tolerance on the screen, a deviation of orientation of the work-piece or alignment of the two contours followed by the feeler tips is indicated.

Instead of providing fixed circles 140 and 142 on the screen to indicate tolerance limits, the reticles on the plates 102 and 104 may be in the form of double lines which are shaped to indicate zones of tolerance for the respective contour portions rather than the true outlines of the contours themselves. Thus, the double lines 150 and 152 indicate the tolerance zones when their shadow images are cast on the screen, as at 154 and 156. When the profile circle cuts one, but not both, of the shadow lines 154 or 156, the surface contour of the work-piece is within the limits of tolerance, but if the profile circle cuts both or neither of the lines 154 or 156, then the work-piece is defective. This manner of indicating the tolerance zones is more flexible than that shown in Figure 13, since the latter indicate tolerances which are uniform in magnitude over the entire contour portions examined whereas the double lines 150, for example, do not have to be uniformly spaced apart but can be variously spaced at different points, as indicated in Figure 14. This method of indicating tolerance zones is therefore preferable in certain cases as when it is desired that the tolerable error at any point proportional to the thickness of the blade at that point.

We claim:

1. Apparatus for examining a cross-sectional contour of a solid object such as a turbine blade, comprising a base, support means horizontally movable on said base, a pair of horizontal arms carried by said support means and movable up and down thereon and horizontally therewith, said arms being arranged one above the other and having vertically aligned feeler tips at one end thereof adapted to move across the upper and lower faces of a fixed work-piece when said support means is moved, a reticle carried by each said arm consisting of a shadow-casting line having the shape of the portion of the contour of a master work-piece traversed by the feeler tip on the same arm, a fixed screen, optical means for casting magnified shadow images of said reticles on said screen, and fixed lines on said screen having the shape of the magnified profiles of said feeler tips and arranged to be tangent to said shadow images respectively when the feeler tips are in contact with the contour of a master work-piece in position for examination.

2. Apparatus as set forth in claim 1, said reticles having the sizes as well as the shape of the corresponding contour portions.

3. Apparatus as set forth in claim 1, one of said reticles also including a series of numbered lines arranged to facilitate identification of the portions of the contours represented by the portions of the shadow images appearing on the screen.

4. In an apparatus for examining a cross-sectional contour of a solid object such as a turbine blade, a pair of vertically aligned feeler tips, support members carrying said tips and operable to move said tips independently up and down and together horizontally in a common vertical plane, a light-transmitting plate carried by each said member in or parallel to said vertical plane, a reticle on each said plate consisting of an opaque line having the shape of the portion of the work-piece contour traversed by the corresponding feeler tip, a fixed screen, optical means for projecting on said screen magnified shadow images of the portion of each said reticle which represents the portion of the work-piece contour touched by the corresponding feeler tip, fixed outlines on said screen representing magnified reproductions of the profiles of said feeler tips, arranged to be tangent to the respective shadow images of the reticles when the feeler tips are in contact with the contour of a master work-piece, and additional outlines on said screen indicating tolerance limits of deviation of said contour from the prescribed standard.

5. Apparatus as set forth in claim 4, said reticles having the size as well as the shape of the corresponding contour portions.

6. In an apparatus for examining a cross-sectional contour of a solid object such as a turbine blade, a pair of vertically aligned feeler tips, support members carrying said feeler tips and operable to move said tips independently up and down and together horizontally in a common vertical plane, a light-transmitting plate carried by each said member in or parallel to said vertical plane, a reticle on each said plate consisting of opaque lines related to the portion of said contour to be traversed by the corresponding feeler tip and representing the zone of tolerance for such contour portion, a fixed screen, optical means for projecting on said screen magnified shadow images of the portions of said reticles which represent the tolerance zone at the points of said contour touched by the feeler tips, and fixed outlines on said screen representing magnified profiles of said feeler tips.

7. Apparatus for simultaneously examining two cross-sectional contours of a solid object such as a turbine blade, comprising a base, support means horizontally movable on said base, two pairs of horizontal arms carried by said support means and movable up and down thereon and horizontally therewith in two parallel planes, each said pair of arms consisting of an upper arm above a lower arm with vertically aligned feeler tips at one end, each said arm having at its other end a reproduction of the correct contour outline to be traversed by the corresponding feeler tip, a screen, optical means for casting mutually spaced magnified shadow images of a portion of each said reproduction on the screen, and fixed lines on said screen representing the magnified profiles of said feeler tips and arranged to be tangent respectively to the shadow images of said reproductions when the four feeler tips are in contact with the surface of a master work-piece having correct contours.

8. Apparatus for examining the cross-sectional contours of a solid object such as a turbine blade, comprising a base, a standard horizontally movable on said base in a straight path, two pairs of horizontal arms carried by said standard and independently movable up and down thereon, each said pair consisting of an upper arm above a lower arm, vertically aligned pairs of feeler tips mounted at one end of said pair of arms, means for supporting a work-piece in a horizontal position in which the feeler tips can be moved along the contours to be examined, a light-transmitting plate carried by each said arm at its other end in or parallel to the planes of movement of said feeler tips, a reticle on each said plate comprising a shadow-casting line having the shape of the portion of the contour of a master work-piece engageable by the corresponding feeler tip, a fixed screen, fixed juxtaposed outlines on said screen representing magnified profiles of the four feeler tips, and optical means for casting on said screen magnified shadow images of the portions of said reticles corresponding to the portions of the contours in contact with the feeler tips.

9. Apparatus for simultaneously examining two cross-sectional contours of a solid object such as a turbine blade in two parallel planes which are transverse with respect to the long axis of the object and are substantially spaced apart, said apparatus comprising means for gripping a work-piece in position for examination, two pairs of feeler tips, one of said pairs being adapted to engage simultaneously the upper and lower surfaces of the work-piece in one of said planes, the other said pair being adapted to engage simultaneously the upper and lower surfaces of said work-piece in the other said plane, means supporting said pairs of feeler tips and operable to move said pairs of tips in their respective planes simultaneously across and in contact with said surfaces, a fixed screen, fixed lines of reference on said screen for each of said pairs of feeler tips, shadow-casting means moving with and reproducing the movements of the several said feeler tips, and optical means for casting mutually spaced shadow images of said shadow-casting means on said screen, the arrangement of said feeler tips, shadow-casting means, screen, lines of reference and optical means being such as to indicate deviations of said contours from the standard contours and to indicate deviations in the mutual alignment of said contours from the standard alignment.

ROBERT O. BEARDSLEY.
JAMES A. ALLAN.

REFERENCES CITED

The following references are of record in the file of this patent:

UNITED STATES PATENTS

| Number | Name | Date |
|---|---|---|
| 1,609,103 | Baldwin | Nov. 30, 1926 |
| 1,789,009 | Luce | Jan. 13, 1931 |
| 1,840,470 | Schneider | Jan. 12, 1932 |
| 1,850,173 | Hall | Mar. 29, 1932 |
| 2,100,056 | Klamp | Nov. 23, 1937 |
| 2,451,155 | De Boer | Oct. 12, 1948 |